W. S. Ryerson's Hoop Skirt.
2842
Reissued
Jan 14 1868
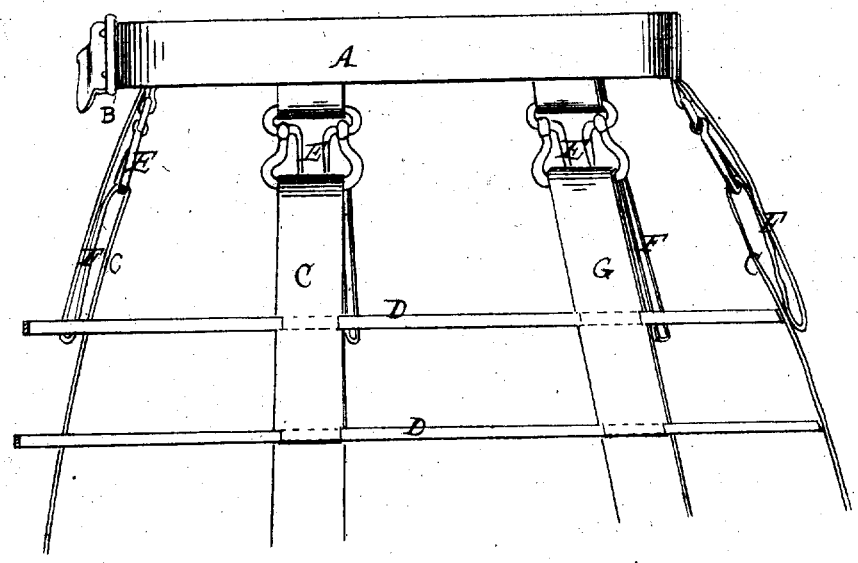
Witnesses.
Theo Tusche
Wm Dean Overell
Inventor.
W. S. Ryerson
Per Wm
Attorneys

UNITED STATES PATENT OFFICE.

WILLIAM S. RYERSON, OF PHILADELPHIA, PENNSYLVANIA.

IMPROVEMENT IN HOOP-SKIRTS.

Specification forming part of Letters Patent No. 68,238, dated August 27, 1867; Reissue No. 2,842, dated January 14, 1868.

*To all whom it may concern:*

Be it known that I, WILLIAM S. RYERSON, of the city and county of Philadelphia, in the State of Pennsylvânia, have invented and made a certain new and useful Improvement in Hoop-Skirts; and I do hereby declare the following to be a full, clear, and exact description of the said invention, reference being had to the annexed drawing, making part of this specification, wherein I have represented a section of the band and upper part of the skirt to illustrate my said invention.

Heretofore, hoop or ladies' skeleton skirts have been made with tapes or other connections running vertically to connect the hoop. These vertical connections have been of a character that precluded an adjustment for varying the length of the skirt according to the height of the wearer or the circumstances under which it was to be worn; neither could they be adjusted to suit different sizes of hips.

The object of my invention is to remedy these aforesaid difficulties, and consists in an adjustment applied to the vertical connections of the skirt, so that the entire length thereof may be varied to suit the person, or produce more or less trail, or to conform to the shape of the person. Besides these conveniences of the skirt itself, the manufacture will be facilitated, as the sizes of skirts can be varied without requiring so many frames.

In the drawing, A represents the waistband with a buckle or fastening at B.

*c* are the vertical tapes or connections of any usual character between the hoops D D.

E is the buckle, of suitable size and shape, for adjusting the length of said vertical connections.

F represents the fold or slack loop of the tape between the buckle and the band A, to which band A the tapes *c* are shown as connected at their ends.

I am aware that skeleton skirts have been constructed so that portions could be unhooked or removed, and also that the skirt could be hooked up to vary its vertical length; but none of these devices were adapted to or employed for adjusting the skirt at the sides near the waistband, so as to accommodate the size and shape of the hips, and at the same time vary the length of the skirt, if necessary.

What I claim, and desire to secure by Letters Patent, is—

A skeleton skirt provided with buckles or their equivalents near the waistband, for adjusting the vertical tapes or connections at the sides of the skirt to accommodate the size and shape of the hips, or vary the length of the skirt, substantially as set forth.

In witness whereof I have hereunto set my signature this 9th day of September, 1867.

WM. S. RYERSON.

Witnesses:
CHAS. H. SMITH,
GEO. D. WALKER.